United States Patent [19]
Schütze

[11] Patent Number: 5,496,002
[45] Date of Patent: Mar. 5, 1996

[54] AIRCRAFT WINGS

[75] Inventor: Rainer Schütze, Braunschweig, Germany

[73] Assignee: Deutsche Forschungsanstalt fur Luft-und Raumfahrt e.V., Cologne, Germany

[21] Appl. No.: 300,786

[22] Filed: Sep. 2, 1994

[30]  Foreign Application Priority Data

Sep. 3, 1993 [DE] Germany ..................... 43 29 744.7

[51] Int. Cl.⁶ ..................................................... B64C 3/18
[52] U.S. Cl. ........................... 244/123; 416/226; 416/230; 416/244 R; 244/131
[58] Field of Search ............................... 244/123, 117 R, 244/131, 133, 132, 119; 416/226, 230

[56]  References Cited

U.S. PATENT DOCUMENTS

| | | | |
|---|---|---|---|
| 2,540,482 | 2/1951 | Hervey | 244/123 |
| 2,593,714 | 4/1952 | Robinson | 244/123 |
| 3,013,614 | 12/1961 | Platt | 416/226 |
| 3,105,557 | 10/1963 | Wigil | 416/226 |
| 3,368,599 | 2/1968 | Dailey | 244/123 |
| 4,725,021 | 2/1988 | Priddy | 244/123 |
| 5,332,178 | 7/1974 | Williams | 244/123 |

FOREIGN PATENT DOCUMENTS

| | | | |
|---|---|---|---|
| 158433 | 4/1940 | Austria | 244/123 |
| 143864 | 8/1921 | United Kingdom | 244/123 |
| 1211875 | 11/1970 | United Kingdom . | |
| 2164618 | 3/1986 | United Kingdom | 244/123 |
| 2260961 | 5/1993 | United Kingdom . | |

*Primary Examiner*—Galen L. Barefoot
*Attorney, Agent, or Firm*—Salter & Michaelson

[57]  ABSTRACT

A wing made of composite fibre materials, especially carbon fibre reinforced plastics, comprises shell components having a thin-walled, pre-formed wing skin and tubular rods as stringers. The stringers are provided with a connection element and a compression plate at the fuselage end of the wing. The external sides of the compression plates are all in one plane. The wing is attached by screws, which are screwed through the connection element at the fuselage side into the connection elements of the rods forming the stringers. The rods forming the stringers are adhered to the inside of the wing skin. The spaces between the rods may be filled with a light, compression-proof material.

10 Claims, 3 Drawing Sheets

AIRCRAFT WINGS

BACKGROUND OF THE INVENTION

The invention relates to wings for aircraft and more particularly to wings with wing shells made of composite fibre materials, especially carbon fibre reinforced plastics.

The trend in modern aircraft construction is to make increasing use of shell components made of carbon fibre reinforced plastics. Such components generally comprise the wing skin and stringers joined to it. Longitudinal forces are generally transmitted by both the skin and the stringers. In the case of highly stressed wing shells very large wall thicknesses have to be used for the wing skin and stringers owing to the strong forces. Adhesion of thick-walled components creates problems concerning the damage tolerance of the shell and particularly partial detachment of individual stringers from the wing skin due to impact loads, and subsequent tear propagation at a detached location. Such skin-stringer connections are generally secured by rivets in addition to adhesion.

A further problem is the introduction of longitudinal forces into the wing shell. Connection methods borrowed largely from metal construction are used here, even for wing components made of composite fibre materials. But well-tried connection methods in metal construction are often not suitable for the fibres in structures made of composite fibre materials, i.e. they are not adapted to the special properties of composite fibre materials, so must necessarily lead to compromises in the formation of the structure. In addition they are generally labour-intensive.

SUMMARY OF THE INVENTION

The invention seeks to provide a wing of the type described above in such a way that more allowance is made for the properties of composite fibre materials than in known constructions.

Accordingly the invention provides an aircraft wing comprising wing shell portions made of composite fibre material, a wing spar box, said wing spar box having ribs, stringers arranged longitudinally of the wing, and a wing skin lying on and adhering to the stringers, wherein said stringers are in the form of rods, each said rod comprising a tubular wall made of composite fibre material on a core, said tubular wall comprising at least one layer of axially parallel, unidirectional fibres and a fabric tube or sleeve over said layer with fibres crossing at an angle to the axis of said rod, each said rod being provided with a rotationally symmetrical connection element at one end of the wing, for axially introducing tension and/or compressing forces, said connection element having an outwardly directed end face, and said connection element being surrounded by said tubular wall of said rod and being provided with a coaxial connection thread and a conical portion having a surface tapering towards said end of said rod, said axially parallel, unidirectional fibres contacting said surface of said conical portion of said connection element over its entire length, and said tubular wall protrudes beyond said outwardly directed end face of said connection element, and a peripheral winding is provided at least adjacent said conical portion of said connection element, and said conical portion of said connection element has a cone tip angle ($2\alpha$) such that said connection element is held in self-locking manner in the conical end portion of said tubular wall of said rod, and a compression plate is further arranged at said end of said rod and lies against said end face of said tubular wall.

BRIEF DESCRIPTION OF THE DRAWINGS

Preferred embodiments of the present invention will now be described, by way of example only with reference to the accompanying drawings, of which.

DESCRIPTION OF THE PREFERRED EMBODIMENTS

Basically the present invention provides an aircraft wing with wing shell portions made of composite fibre material, with a wing spar box having ribs arranged in the direction of the profile, stringers arranged longitudinally of the wing, and a wing skin lying on and adhering to the stringers, wherein the stringers are in the form of rods with a tubular wall made of composite fibre material on a core, with at least one layer of axially parallel, unidirectional fibres and a fabric tube or sleeve over said layer with fibres crossing at an angle to the axis of the rod, each rod being provided with a rotationally symmetrical connection element at the fuselage end of the wing, for axially introducing tension and/or compression forces, which element is surrounded by the wall of the rod and provided with a coaxial connection thread and a conical portion tapering towards the end of the rod, the axially parallel, unidirectional fibres contacting the surface of the conical portion of the connection element over its entire length, and the tubular wall made from the unidirectional fibres and the fabric tube or sleeve protrudes beyond the outwardly directed end face of the connection element, and a peripheral winding is provided at least in the conical region of the connection element, and the conical portion of the connection element has a cone tip angle ($2\alpha$) such that the connection element is held in self-locking manner in the conical end portion of the tubular wall of the rod, and a compression plate is further arranged at the end of the rod and lies against the end face of the tubular wall.

In a wing according to the invention the wing skin, which may be comparatively thin, takes up the shearing forces from the torsional moment of the wing, while the longitudinal forces arising are passed through the rods adhering to the wing skin. There is thus a separation of functions, with nearly all the shearing forces being transmitted through the skin and nearly all the longitudinal forces through the rods. Almost the whole area of the wing skin is reinforced by means of the stringers, particularly in the region of the wing spar box.

Figure 1:
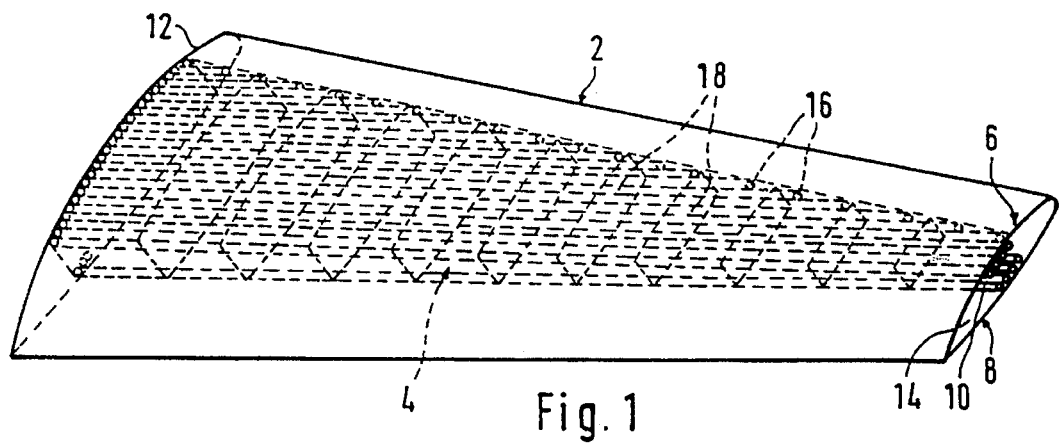
FIG. 1 is a diagrammatic representation of a supporting wing.
Figure 2:
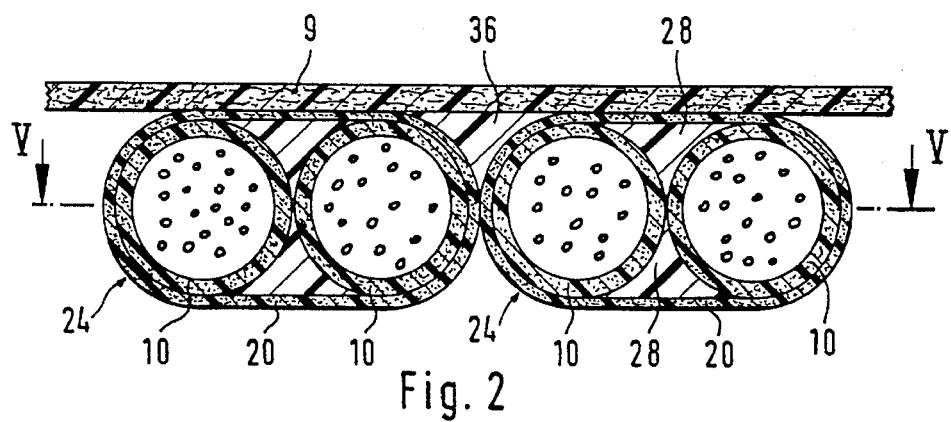
FIG. 2 shows an embodiment of the stringers and their connection to the wing skin.
Figure 3:
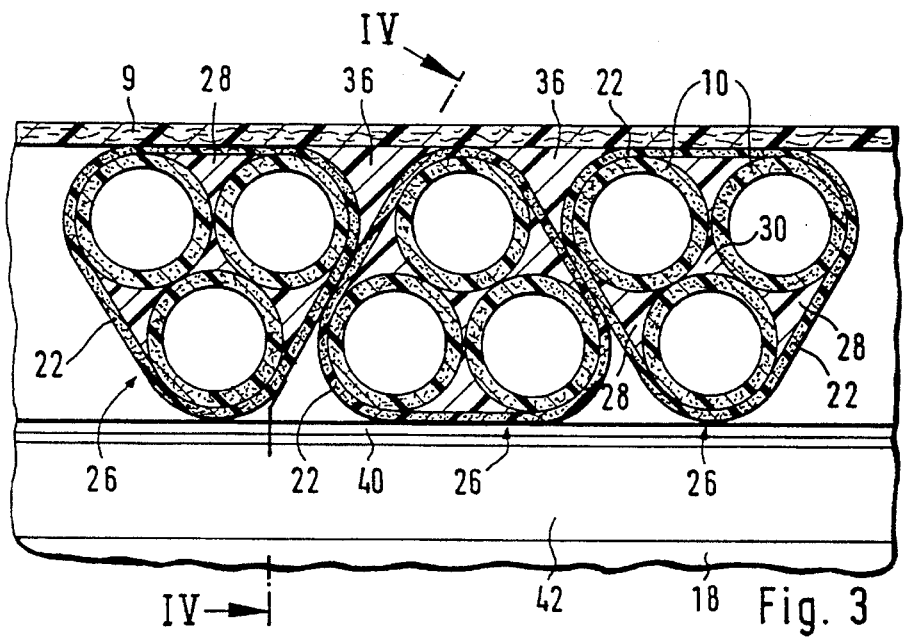
FIG. 3 shows a further embodiment of the stringers and their connection to the wing skin, and the connection between the stringers and ribs extending in the direction of the profile.
Figure 4:
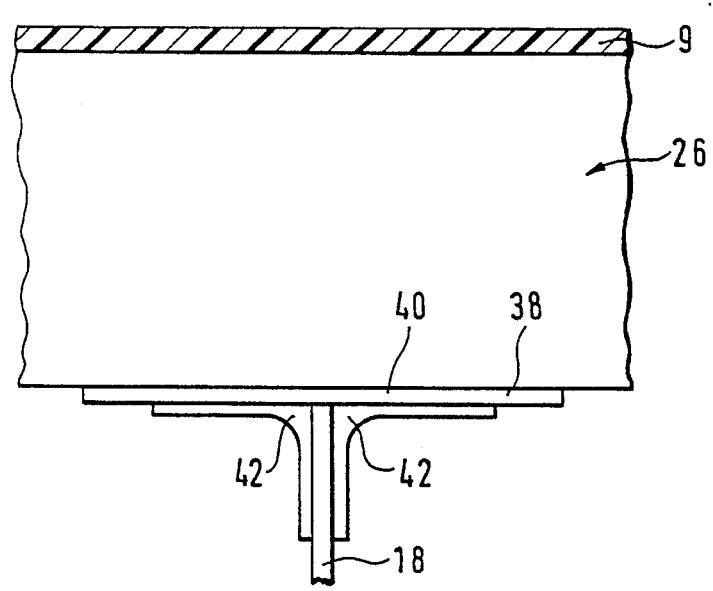
FIG. 4 is a section taken along the line IV—IV in FIG. 3.

Referring now to the drawings, the supporting wing 2 illustrated in FIG. 1 has a wing spar box 4, an upper wing shell 6 and a lower wing shell 8. The two wing shells are provided with stringers 10, at least some of which extend from the fuselage end 12 of the wing to the tip 14 of the wing. The stringers 10 are in the form of tubular rods of composite fibre material, a plurality of which may be combined as illustrated in FIGS. 2 and 3 and described in detail below. In this embodiment, the spacing of the stringers in the direction of the profile may be described as closely adjacent.

In the FIG. 1 embodiment the spar box is, as usual, trapezoidal in plan view. The rods arranged at the front in the direction of the profile each extend to the front wall of the spar box, as indicated by the round circles in that area. Ribs 18, whereby the two wing shells are joined at a spacing from one another and reinforced against one another, are arranged in the direction of the profile.

The rods forming the stringers 10 are provided with connection elements at the fuselage end of the wing 2, as described in detail below with reference to FIGS. 4–7.

The wing skin 9 is preferably made of a composite carbon fibre material, carbon fibre reinforced plastic. The carbon fibre layers are arranged with a ± 45° orientation for optimum transmission of the torsional moment of the wing, the shearing forces of which are taken up by the wing skin.

The rods 10 of carbon fibre reinforced plastic which form the stringers are glued or adhered to the wing skin 9. It is they which transmit nearly all the longitudinal forces.

Reinforcement of the skin is also obtained through the rods. The number of rods used as or in the stringers and thus the distance between them depend on the longitudinal forces to be overcome. The rods may be arranged in one layer—FIG. 2—or in two layers—FIG. 3—if one layer of closely adjacent rods is not sufficient to transmit the force.

To improve the joining of the rods forming the stringers—hereinafter referred to briefly as rods—to each other and also to the wing skin, the rods are combined in diagonal layers of carbon fibres, such as tape windings or carbon fibre tubular fabric 20, 22, in twos (FIG. 2) or threes (FIG. 3) into packages or bundles 24, 26, in which the rods are arranged parallel. The intermediate spaces formed by the gore or gusset portions 28, 30 formed between the round rods 10 and their covering 20, 22 are filled with a light, compression-proof material. Such material may contain hollow microspheres embedded in a curable synthetic resin. The microspheres may be made of glass or plastics material. The rods are supported in all directions through the filling material in the gore portions and through being bundled by diagonal layers, so all in all a high pressure loading capacity is achieved. The loading capacity of the shell is set by the number of rods and their supporting cross-sectional areas.

Figure 5:
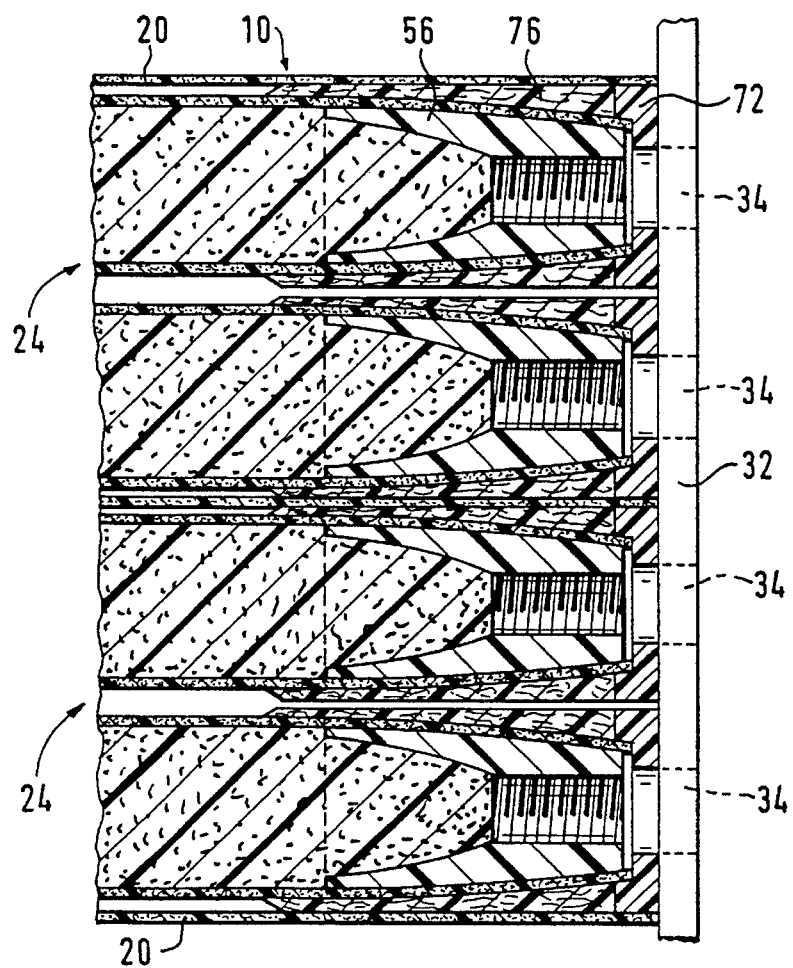
FIG. 5 is a section taken along the line V—V in FIG. 2.
Figure 7:
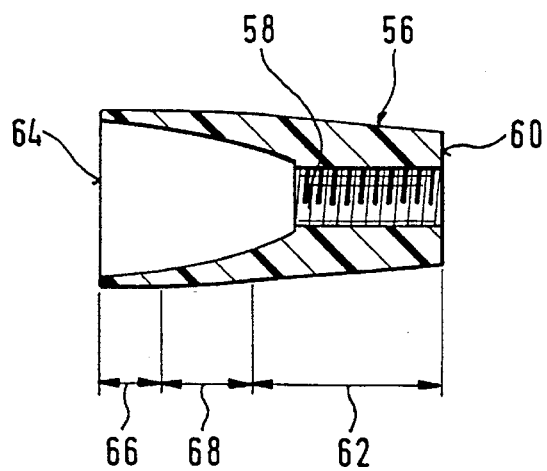
FIG. 7 is a section through a connection element.

At the fuselage end of the wing the rods are provided with force-introducing means, as is shown in FIGS. 5 and 7.

Figure 6:
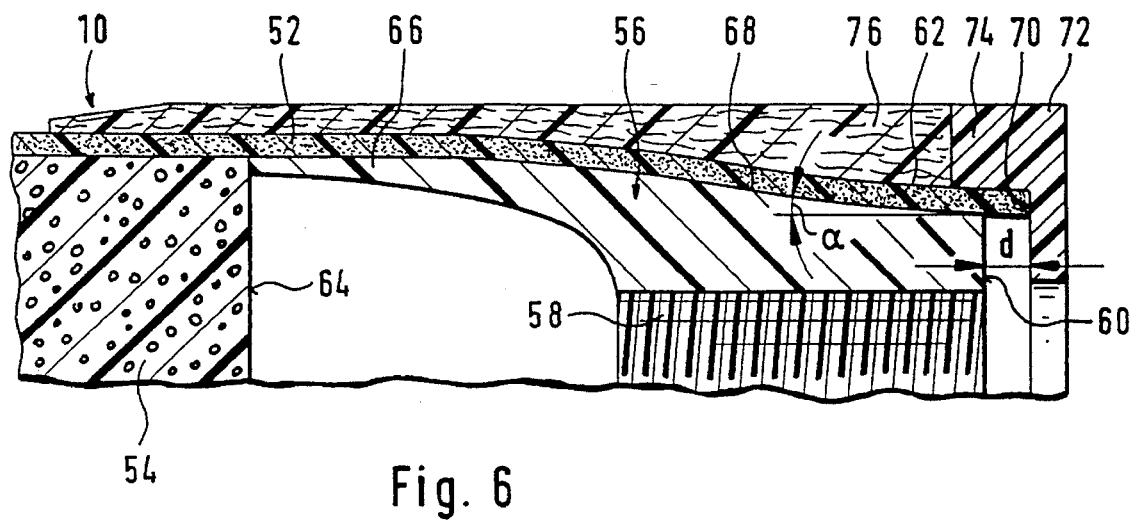
FIG. 6 is a larger-scale section taken through a connecting end of a rod.

As shown in FIGS. 5 and 6, the rods 10 have a tubular wall 52 made of carbon fibre reinforced plastic, with at least one layer of axially parallel, unidirectional fibres and, over it, a fabric tube or sleeve with fibres crossing at an angle to the axis of the rod, and a dimensionally stable core 54 of foamed material. At their fuselage end the rods have a rotationally symmetrical connection element 56 for axially introducing tensile and/or compressive forces, the element 56 being provided with coaxial connecting screwthread 58. As shown in FIG. 7, the connection element 56 preferably has a conical portion 62 tapering to the connection end 60, and the opposite end 64 has an adjoining cylindrical portion 66. A curved transition region 68 may be provided between these two portions. As far as possible the connection element 56 contains a recess extending from the end 64, to reduce the weight.

The tubular wall 52 with the unidirectional fibres lies on the portions 66, 68 and 62 of the connection element 56, and the fabric tube or sleeve is extended in the region of the transition 68 and conical portion 62 to fit the cone tip angle 2α.

The end face 70 of the tubular wall 52 projects a distance d beyond the end 60 of the connection element 56. A compression plate 72 is placed on the end of the tubular wall and has an annular collar 74 which engages over that wall for a limited length. The function of the compression plate 72 is to transmit compressive forces into the tubular wall and also to form an abutment for a peripheral winding 76 which extends over the length of the connection element 56 and preferably also beyond it over a limited portion of the tubular wall of the rod 10. The winding is made of high-strength fibres in a synthetic resin matrix.

The cone tip angle 2α is selected so that, by applying appropriate pre-stressing in the peripheral winding, the connection element is held in a self-locking manner, i.e. without hysteresis, in the conical end portion of the tubular wall of the rod. However the angle 2α must not be too small, in order to avoid overloading the peripheral winding. A suitable cone tip angle 2α would be between 8° and 10°.

For pre-stressing purposes a tightening screw may be screwed into the connection element, whereby the reaction force of the tensile force exerted by the tightening screw on the connection element can, by means of the compression plate 72, be exerted as a compressive force on the end face 70 of the tubular wall of the rod. The tensile force should exceed the maximum tensile force to be transmitted by a predetermined amount. With this prestressing the overlap d is diminished, and the selected cone tip angle 2α ensures a self-locking action, so that the compressive and/or tensile forces calculated for operation can be transmitted through the connection element without that element being displaced in the tubular wall of the rod, i.e. without hysteresis.

The full cross-section of the axially parallel fibres, which are in contact with the compression plate end-on, is available for transmitting tensile and compressive forces at every point over the length of the tubular wall of the rod. The construction of the rods with the pressure element described is described in further detail in GB-2,260,961 A.

The ends of the rods opposite the fuselage end of the wing may be constructed with or without connection elements.

As shown in section in FIG. 5, the individual rods 10, pairs of which are combined into bundles 20 in the manner described above, are coplanar with the end faces of the connection elements. An adhesive is applied to the inside of the preformed wing skin during assembly. The ends of the rods are brought into contact with a connection template 32 with a bore pattern 30 corresponding to the position of the rods in the wing shell, and are screwed to it. The rods are then glued or adhered to the wing skin, in contact with the inside of the skin. The adhesion may take place successively, with each of the intermediate spaces, or gore or gusset portions, 36 formed on the inside of the wing skin between the rods or bundles of rods then being filled with a filling material.

The assembly template is removed when the adhesive has cured. The end face of the connection elements towards the fuselage is cut flat when the supporting wings have been fully assembled. The wing is then joined to the fuselage by means of a connection element towards the fuselage, through which the high-strength fastening screws are screwed into the connection elements of the individual rods. Thus each of the rods forming the stringers is directly connected to the fuselage.

Connection elements may also be provided at the opposite end of the rod, at least in a number of the rods. Thus rods may then also be joined to a highly stressed rib—for example, a rib to which an engine pod is to be attached—by means of a screw connection which also positively transmits tensile and compressive forces.

As illustrated in FIGS. 5 and 6, the outside diameter of the peripheral winding 76 is generally larger than the outside diameter of the tubular wall 52 of the rods 10. If the rods are required to have parallel axes over their whole length, spacers may be inserted between the rods in the bundles 20, 22 at predetermined spacings.

Rods of the type described above which are used in accordance with the invention have a high static and dynamic load capacity. Rods made of carbon fibre reinforced plastic have considerably higher fatigue strength under vibratory stresses than metallic materials under fatigue stresses of R= −0.5. Whereas a comparable aluminium rod has a static tensile strength of approximately 15 kN, about $10^6$ load alternations are obtained without failure under loads of + 22 kN/−11 kN with rods of carbon fibre reinforced plastic weighing only 50% of the weight of the aluminium rods.

The fibre design with the direct introduction of the forces acting on the rods into the connection at the end of the wing promises a considerable reduction in weight compared with conventional connections of components made of carbon fibre reinforced plastic. Owing to the extensive separation of the functions of the wing skin and the rods acting as stringers and the concomitant dominance of fibres in the composite materials, fibre strength can be utilised to a much higher degree than is the case in a conventionally stringer-reinforced shell with multi-directional laminate construction. A lower structural weight will thus also be obtained for the wing shell.

Owing to the large number of rods used there is a fail-safe effect, whereby failure of individual rods only slightly impairs the safety of the whole structure. The thinness of the laminate forming the wing skin and its adhesion to the whole area of the bundled rods give the shell high damage tolerance. Detachment of the skin from the rods, such as may be caused by impact loads, remains largely local and, in contrast with detachment of adhering stringers in a conventional shell, shows only a slight tendency for the damage to progress. Damage to the rods is also limited to those directly concerned, and there is only a slight tendency for other rods to be affected. Denting of the shell under pressure stress can be avoided if the buckling lengths of the bundled rods dictate the spacing between the wing ribs.

The finished rods may be subjected to 100% quality control prior to assembly. Since they are loaded to a tension threshold in excess of the maximum tensile force envisaged, as described above, there is also an opportunity to check pressure load capacity in the same apparatus.

Adhesion between the skin and the rods or bundles of rods may be checked in critical parts of the structure in the form of a 100% ultrasonic test.

The rods of carbon fibre reinforced plastic are relatively cheap semi-finished products, which are stuck to a very simple and therefore economically manufactured skin.

Tensile and compressive forces arising in the direction of the profile, for example through engine thrust, can be taken up by reinforcing structures adhering to the inside of the rods, with unidirectional fibres extending in the direction of the profile. In the case of weak forces such structures 38 may be in strip form, as shown diagrammatically in FIGS. 3 and 4.

Reinforcing structures in strip form with unidirectional fibres extending in the direction of the profile, which can be stuck to the rods over the whole area or at least over a large area on the inside of the shell, particularly with the bundling illustrated in FIGS. 2 and 3, are desirably also provided for the connection between the ribs and the wing shells. As shown in FIG. 5 the ribs may be in the form of panels 40 of a carbon fibre reinforced plastic with the fibres positioned at ± 45° to the inside of the shell. Such panels 40 may be joined to the strip reinforcements 38 through adhesion by means of angles 42 of carbon fibre reinforced plastic, again with the fibres in a ± 45° position. The ribs may equally be in a sandwich structure.

It will be understood that the above description of the present invention is susceptible to various modifications, changes and adaptations.

I claim:

1. An aircraft wing comprising wing shell portions made of composite fibre material, a wing spar box, said wing spar box having ribs, stringers arranged longitudinally of the wing, and a wing skin lying on and adhering to the stringers, wherein said stringers are in the form of rods, each said rod comprising a tubular wall made of composite fibre material on a core, said tubular wall comprising at least one layer of axially parallel, unidirectional fibres and a fabric tube or sleeve over said layer with fibres crossing at an angle to the axis of said rod, each said rod being provided with a rotationally symmetrical connection element at one end of the wing, for axially introducing tension and/or compression forces, said connection element having an outwardly directed end face, and said connection element being surrounded by said tubular wall of said rod and being provided with a coaxial connection thread and a conical portion having a surface tapering towards said end of said rod, said axially parallel, unidirectional fibres contacting said surface of said conical portion of said connection element over its entire length, and said tubular wall protrudes beyond said outwardly directed end face of said connection element, and a peripheral winding is provided at least adjacent said conical position of said connection element, and said conical portion of said connection element has a cone tip angle ($2\alpha$) such that said connection element is held in self-locking manner in the conical end portion of said tubular wall of said rod, and a compression plate is further arranged at said end of said rod and lies against said end face of said tubular wall.

2. An aircraft wing according to claim 1, wherein said rods are coplanar with said compression plates at said one end of said wing.

3. An aircraft wing according to claim 1, wherein said rods adjacent the wing skin have intermediate spaces therebetween, said intermediate spaces being filled with a light, compression-proof material.

4. An aircraft wing according to claim 1, wherein said rods have cores, said cores being of foam material.

5. An aircraft wing according to claim 1, wherein said composite fibre material comprises carbon fibre reinforced plastics material.

6. An aircraft wing according to claim 1, wherein said rods have been subjected to a prestress exceeding the forces to be transmitted in use.

7. An aircraft wing according to claim 1, wherein at least two adjacent said rods are combined within an outer fabric layer, with fibres extending at an angle equal to or greater than ± 45° to the axes of the rods, and the spaces inside the fabric layer are filled with a light, compression-proof material.

8. An aircraft wing according to claim 1, wherein said rods are grouped in threes wrapped in a triangular structure with an outer fabric layer, with fibres extending at an angle equal to or greater than ± 45° to the axes of said rods, and the spaces inside the fabric layer are filled with a light, compression-proof material.

9. An aircraft wing according to claim 1, wherein said wing skin is made of a composite fibre material with fibres extending at ± 45° to the longitudinal axis of the wing.

10. An aircraft wing according to claim 1, wherein reinforcing structures with unidirectional fibres are arranged on the inside of said shells, said structures being in strip form.

* * * * *